United States Patent
Goudon et al.

(10) Patent No.: US 10,026,978 B2
(45) Date of Patent: Jul. 17, 2018

(54) METHOD OF GENERATING ELECTRICITY WITH A FUEL CELL; ASSOCIATED DEVICE

(71) Applicants: AIRBUS SAFRAN LAUNCHERS SAS, Paris (FR); SAFRAN POWER UNITS, Toulouse (FR)

(72) Inventors: Jean-Philippe Goudon, Maisons-Alfort (FR); Arnaud Fournet, Merignac (FR); Pierre Yvart, Ballancourt sur Essonne (FR); Philippe Gautier, Le Plessis Pate (FR); Laurent Soulie, Bordeaux (FR); Fabien Boudjema, Garches (FR)

(73) Assignees: AIRBUS SAFRAN LAUNCHERS SAS, Paris (FR); SAFRAN POWER UNITS, Toulouse (FR)

( * ) Notice: Subject to any disclaimer, the term of this patent is extended or adjusted under 35 U.S.C. 154(b) by 0 days.

(21) Appl. No.: 15/520,704

(22) PCT Filed: Oct. 20, 2015

(86) PCT No.: PCT/FR2015/052819
§ 371 (c)(1),
(2) Date: Apr. 20, 2017

(87) PCT Pub. No.: WO2016/062965
PCT Pub. Date: Apr. 28, 2016

(65) Prior Publication Data
US 2017/0309934 A1    Oct. 26, 2017

(30) Foreign Application Priority Data
Oct. 21, 2014 (FR) .................................. 14 60100

(51) Int. Cl.
*H01M 8/04* (2016.01)
*H01M 8/04225* (2016.01)
(Continued)

(52) U.S. Cl.
CPC .......... *H01M 8/04225* (2016.02); *C01B 3/04* (2013.01); *C01B 3/065* (2013.01);
(Continued)

(58) Field of Classification Search
CPC .......... C01B 3/0031; C01B 3/02; C01B 3/04; H01M 8/04253; H01M 8/04955; H01M 8/04223; H01M 8/04
See application file for complete search history.

(56) References Cited

U.S. PATENT DOCUMENTS 6,376,113 B1 * 4/2002 Edlund .................... B01J 8/006
                                                                    429/410
2006/0096993 A1   5/2006 Takashima

FOREIGN PATENT DOCUMENTS

EP     1 249 427     10/2002
EP     1 405 823     4/2004
(Continued)

OTHER PUBLICATIONS

International Search Report as issued in International Patent Application No. PCT/FR2015/052819, dated Jan. 5, 2016.
(Continued)

*Primary Examiner* — Mark F. Huff
*Assistant Examiner* — Monique M Wills
(74) *Attorney, Agent, or Firm* — Pillsbury Winthrop Shaw Pittman LLP (57) ABSTRACT

A method of generating electricity with a fuel cell includes a phase in which the cell is primed; and a phase in which the cell functions at a stable rate, during which the cell, fed with a hydrogenated gas, generates electricity and heat. In order to prime the cell, it is fed with a hydrogenated gas including at least 70 vol. % hydrogen, generated by self-sustaining combustion of at least one hydrogenated gas-generating solid pyrotechnic charge; and while it is operating at a stable
(Continued)

rate, the cell is fed with a hydrogenated gas containing at least 85 vol. % hydrogen, generated by thermal decomposition of at least one hydrogenated gas-generating solid pyrotechnic charge; a portion of the heat produced by the operating cell being transferred to the at least one solid charge in order to start and maintain the thermal decomposition thereof.

20 Claims, 1 Drawing Sheet

(51) Int. Cl.
*C01B 3/06* (2006.01)
*H01M 8/0606* (2016.01)
*H01M 8/04223* (2016.01)
*C01B 3/04* (2006.01)
*H01M 8/04007* (2016.01)

(52) U.S. Cl.
CPC ..... *H01M 8/04223* (2013.01); *H01M 8/0606* (2013.01); *C01B 2203/0266* (2013.01); *C01B 2203/0277* (2013.01); *C01B 2203/066* (2013.01); *H01M 8/04007* (2013.01); *Y02E 60/362* (2013.01); *Y02E 60/364* (2013.01)

(56) References Cited

FOREIGN PATENT DOCUMENTS

| | | |
|---|---|---|
| EP | 1 405 824 | 4/2004 |
| EP | 1 496 035 | 1/2005 |
| EP | 2 014 631 | 1/2009 |
| FR | 2 906 805 A1 | 4/2008 |
| FR | 2 999 167 A1 | 6/2014 |
| FR | 2 999 168 A1 | 6/2014 |
| FR | 2 999 169 A1 | 6/2014 |
| WO | WO 2009/138629 A1 | 11/2009 |
| WO | WO 2014/065923 A1 | 5/2014 |

OTHER PUBLICATIONS

International Preliminary Report on Patentability and the Written Opinion of the International Searching Authority as issued in International Patent Application No. PCT/FR2015/052819, dated Apr. 25, 2017,.

* cited by examiner

METHOD OF GENERATING ELECTRICITY WITH A FUEL CELL; ASSOCIATED DEVICE

CROSS-REFERENCE TO RELATED APPLICATIONS

This is the U.S. National Stage of PCT/FR2015/052819, filed Oct. 20, 2015, which in turn claims priority to French Application No. 1460100, filed Oct. 21, 2014, the entire contents of all applications are incorporated herein by reference in their entireties.

The present invention relates to the operation of fuel cells, in particular portable or onboard fuel cells. More particularly, it relates to a process for generating electricity with a fuel cell and to an associated device (very particularly suitable for carrying out said process).

The invention very particularly finds an application in the context of supplying hydrogen to low- and medium-power (1 to 100 watts (W)) fuel cells, or even fuel cells of higher power (several kW), which fuel cells are in particular used in aeronautical and military fields, such as those equipping drones, those equipping foot soldiers, and those used for powering emergency aeronautical electrical generators and auxiliary aeronautical electrical generators. The electric powers targeted in this context are generally around ten times higher than the powers consumed by portable electrical equipment, such as cell phones.

Fuel cells are alternative sources of electrical energy that provide a solution to the new energy and environmental requirements. Fuel cells have an onboard energy density potential at least four times greater than that of lithium batteries. They do not release greenhouse gases.

The production and the storage of the hydrogen necessary for supplying fuel cells with fuel (hydrogen) are thus topical technical problems, which are the subject of much research.

The permanent storage of hydrogen under pressure in tanks is widely used. Such storage is in particular described in patent application US 2006/0096993. This type of storage is however not liked very much due, on the one hand, to the dangerousness of pressurized hydrogen and, on the other hand, to the associated maintenance and control operations. The weight of the pressurized tanks is also a handicap for mobile applications.

One approach developed for hydrogen production is based on the use of solid pyrotechnic materials that generate hydrogen by combustion (in fact that generate, by combustion, hydrogen-containing gases having a high content of hydrogen (at least 70% by volume (see below))). It makes it possible to do away with the problem of permanent storage of (liquid or gaseous) fluid. It is particularly advantageous insofar as said solid pyrotechnic materials exhibit high stability under storage conditions and great simplicity of use.

Such hydrogen-generating solid pyrotechnic materials have in particular been described in patent applications EP 1 249 427, EP 1 405 823, EP 1 405 824, EP 1 496 035, EP 2 014 631 and EP 2 265 545. There are in the form of blocks, disks, pellets, granules or grains. The composition thereof contains a hydrogen-containing reducing component of inorganic hydride, borazane or aminoborane polymer (polyaminoborane) type and an inorganic oxidizing component. The combustion thereof generates hydrogen with a good yield (~11% to 13% theoretical yield by weight). The combustion temperature thereof (~800 K to 1200 K) is high enough so that the reaction is self-sustaining after ignition. The self-sustaining combustion of these materials is favored by the pressurization in the combustion chamber. It was seen above that such materials in fact produce hydrogen-containing gases having a high content of hydrogen (=containing at least 70% by volume of hydrogen).

The use of such solid pyrotechnic materials for supplying a fuel cell with hydrogen should be controlled, or even optimized, with reference to numerous requirements. Since the fuel cell usually requires a supply of hydrogen at moderate temperature (temperature generally between 80° C. and 220° C.; temperature below 350 K (around 100° C.) for "low-temperature" fuel cells), in order to conserve the membrane of said fuel cell, the hydrogen-containing gas supplied by the solid pyrotechnic material should be cooled. Furthermore, the fuel cells should be supplied with hydrogen at low overpressures (ideally of several millibar up to 5 bar) with respect to the ambient (atmospheric) pressure (that are compatible with the fuel cell), and since the solid pyrotechnic materials supply hydrogen-containing gases under pressure, said gases should therefore be depressurized before being supplied to the fuel cell. Finally, it is appropriate, or even essential, for the gases supplying the fuel cell to have both a low particle content (it is thus recommended to position a particle filter between the pyrotechnic material and the fuel cell) and a low content of gaseous species ($CO$, $NH_3$, $Cl_2$, $H_2S$) capable of poisoning the catalyst of the fuel cell (it is thus recommended to position a chemical filter between the pyrotechnic material and the fuel cell).

The use of these solid pyrotechnic materials, which are very effective in terms of production of hydrogen-containing gases and advantageous in that they produce the hydrogen-containing gases in a self-sustaining manner after the ignition thereof, therefore requires means for depressurization, for filtration (particulate and chemical) and optionally for cooling of the hydrogen-containing gases produced before the delivery of these gases to the fuel cell. Finally, although highly stable (not very sensitive), these solid pyrotechnic materials nevertheless exhibit a risk of self-ignition if they are subjected to an accidental thermal and/or mechanical stress. The packaging and use thereof therefore calls for precautions. These safety constraints may become prohibitive beyond a certain weight of pyrotechnic material. Generally, all means associated with the use of these solid pyrotechnic materials, depressurization means, filtration means, cooling means, and means relating to safety, have an unfavorable impact on the weight, bulkiness and cost of the device in question.

The use of solid non-pyrotechnic materials that generate hydrogen (in fact that generate hydrogen-containing gases having a high content of hydrogen (at least 85% by volume (see below)), is also known for supplying a fuel cell with hydrogen (with hydrogen-containing gases). These solid non-pyrotechnic materials release a hydrogen-containing gas by thermal decomposition. These materials do not have the constraints, in particular safety constraints, of the pyrotechnic materials (see above) but it is necessary, theoretically at least at the start of their decomposition, to provide them with heat so that they release their hydrogen.

It is thus known to use borazane (or "ammonia borane"), as a solid precursor, in the production of hydrogen (solid precursor that generates a hydrogen-containing gas (having a high content of hydrogen) by thermal decomposition).

Said borazane, of chemical formula $NH_3BH_3$, exists in the form of a crystalline white powder and has the unique potential of containing 19.6% by weight of hydrogen. It is therefore positioned as a particularly advantageous candidate for the solid storage of hydrogen. Said borazane is broken down in three steps and releases hydrogen at each of these three steps. These three steps are exothermic but the first however is preceded by or begins with the endothermic melting of the borazane. Due to the endothermic nature of this melting (which is optionally encompassed in the first decomposition step), it is imperative to provide heat to the borazane for the start of its decomposition. Heat is in fact opportunely provided throughout the thermal decomposition of the borazane (in order to avoid any drop in temperature of the borazane, capable of leading to the stopping of the decomposition in progress).

The heat necessary for starting (and maintaining) the decomposition of these solid materials (reference was made above to borazane: preferred hydrogen-generating solid material, but a person skilled in the art knows other hydrogen-generating solid materials, in particular polyaminoboranes and hydrides) may be provided either by recovering the heat produced by the fuel cell in operation (a person skilled in the art knows that a fuel cell inexorably releases a substantial amount of heat during its operation), or by recovering some of the electrical energy provided by the fuel cell (Joule effect). This assumes however that the fuel cell is in operation.

The recovery of heat (and the recovery of electricity) produced by the fuel cell for the thermal decomposition of the hydrogen-generating material therefore poses the problem of the initiation (starting) or start-up of the fuel cell. In fact:

either the fuel cell should be supplied by an external source of hydrogen in order to be started to be able to produce the heat necessary for starting the decomposition of the hydrogen-generating material, the process then being self-sustaining, or it is necessary to provide the hydrogen-generating material, in order to start the decomposition thereof, with heat produced by an external source of energy, the process then being self-sustaining.

To date, to the knowledge of the applicant, a satisfactory solution has still not been proposed for the technical problem of initiating such a process: a process of operating a fuel cell supplied with hydrogen originating from the thermal decomposition of a hydrogen-generating material.

The present invention proposes a particularly satisfactory novel solution to this technical problem of initiating such a process (technical problem of the start-up of the fuel cell). It proposes, more generally, a process and a device (suitable for the implementation of said process) for generating electricity with a fuel cell. Said process is particularly advantageous in that its implementation requires only solid sources of hydrogen and in that it is suitable for fuel cells operating at low temperature (at less than 100° C., for example at around 80° C.) and high temperature (between 100° C. and 220° C.), very particularly for fuel cells operating at high temperature (see below: the start-up (starting) phase of the fuel cell requires a lower intensity cooling of the hydrogen-containing gases generated by combustion (relative to the intensity of the cooling required for the fuel cells operating at low temperature) and the fuel cell in operation makes more heat available for the generation of hydrogen-containing gases by thermal decomposition).

According to its first subject matter, the present invention therefore relates to a process for generating electricity with a fuel cell. Conventionally, said process comprises, in succession:

a start-up phase of said fuel cell, and a steady-state operation of said fuel cell, during which said fuel cell, supplied with a hydrogen-containing gas, generates electricity and heat.

Said "associated" start-up phase and operation are, characteristically, successively carried out as follows:

for its start-up, the fuel cell is supplied with a hydrogen-containing gas, containing at least 70% by volume of hydrogen, generated by self-sustaining combustion of at least one solid pyrotechnic charge that generates hydrogen-containing gas; then following this start-up, during its steady-state operation (in the course of which it generates electricity and heat), said fuel cell is supplied with a hydrogen-containing gas, containing at least 85% by volume of hydrogen, generated by thermal decomposition of at least one solid charge that generates hydrogen-containing gas; a portion of the heat produced by said fuel cell in operation being transferred to said at least one solid charge for starting and maintaining the thermal decomposition thereof.

Thus, within the context of use of solid non-pyrotechnic materials that generate hydrogen-containing gases by thermal decomposition, in order to operate a fuel cell (the hydrogen-containing gases resulting from this thermal decomposition supplying said fuel cell), the present invention provides:

1) a (preliminary) start-up phase of said original fuel cell, based on the use of solid pyrotechnic materials that generate hydrogen-containing gases by self-sustaining combustion (and not on a supply, by an external source, of heat to said solid non-pyrotechnic materials, that generate hydrogen-containing gases to at least start the thermal decomposition thereof). In other words, within the context of the process of the invention, the fuel cell is started up with at least one solid pyrotechnic charge that generates hydrogen-containing gas by self-sustaining combustion (and it then operates with at least one solid (non-pyrotechnic) charge that generates hydrogen-containing gas by thermal decomposition); and 2) the use of a portion of the heat produced by the fuel cell in operation to successively start and maintain the thermal decomposition of the at least one solid (non-pyrotechnic) charge that generates hydrogen-containing gas by thermal decomposition. It was seen above that heat is assuredly necessary for starting the thermal decomposition (see the endothermic melting mentioned). It has also proved advantageous, or even essential, to provide heat throughout the thermal decomposition in order to maintain a continuous thermal decomposition in a reliable and stable manner.

It has been understood that, during the steady-state operation of the fuel cell, the amount of heat recovered from the fuel cell (obviously linked to the amount of heat that can be recovered, i.e. to the type of fuel cell in question: the more the fuel cell operates at high temperature, the greater the possibility of recovering heat) corresponds to the amount of heat used for the thermal decomposition (the starting thereof and the maintaining thereof) of the at least one solid non-pyrotechnic charge in question. It is understood therefore that there is a correlation between the operating temperature of the fuel cell and the thermal decomposition temperature of said at least one charge, that the associated type of fuel cell and type of charge are linked. Thus, the higher the operating temperature of the fuel cell, the greater the possibility of driving the thermal decomposition of a charge, having an appropriate decomposition temperature, a long way; thus, with high operating temperatures of the fuel cell, it is possible to use charges that decompose at high temperatures.

The second step of the process of the invention is thus carried out without requiring external means (for providing the energy necessary for the thermal decomposition of the at least one non-pyrotechnic charge).

It is furthermore particularly advantageous to cool the fuel cell in operation by recycling the heat recovered (by using said heat to initiate and maintain the thermal decomposition). The fuel cell in operation, cooled by this heat transfer (to the at least one non-pyrotechnic charge), is not generally cooled enough. It is also advisable to cool it in a conventional manner. However, the advantage of the implementation of a conventional cooling of lower amplitude (of a "reduced" cooling) is understood.

Pyrotechnic and non-pyrotechnic charges generating, respectively, in succession, by self-sustaining combustion, hydrogen-containing gases containing at least 70% by volume of hydrogen and, by thermal decomposition, hydrogen-containing gases containing at least 85% by volume of hydrogen, are known per se (see the introduction of the present text). Clarifications to the subject matter thereof are proposed herein below.

As indicated above, the process of the invention operates only with solid sources of hydrogen. Furthermore, 1) said process only uses a solid pyrotechnic source of hydrogen (comprising at least one oxidizing agent and therefore generating hydrogen by combustion) for the starting thereof. It is understood that the weight of said solid pyrotechnic source of hydrogen is therefore limited (advantageously reduced to the minimum necessary for initiating the fuel cell); and 2) for its steady-state operation, said process uses a solid source of hydrogen that contains no oxidizing agent and that therefore has minimal risks of self-ignition. In that respect, the process of the invention is, from a safety point of view, particularly advantageous.

The hydrogen-containing gases generated (in succession by self-sustaining combustion and by thermal decomposition), in order to be suitable for supplying the fuel cell in question, should generally be treated, with reference to their temperature, their pressure, their particle content and/or their content of gaseous species that are poisonous for the catalyst of the fuel cell. The treatments in question are conventional treatments, adapted to the type of fuel cell in question.

Thus, generally, the process of the invention comprises:
  in its start-up phase:
    the self-sustaining combustion of at least one solid pyrotechnic charge in order to generate the hydrogen-containing gas containing at least 70% by volume of hydrogen;
    the treatment of said hydrogen-containing gas generated by self-sustaining combustion so that it is suitable for supplying the fuel cell; and
    the supplying of said fuel cell with said treated hydrogen-containing gas generated;
and
  during the steady-state operation of the fuel cell:
    the thermal decomposition, with a portion of the heat produced by said fuel cell, of said at least one solid charge, in order to generate the hydrogen-containing gas containing at least 85% by volume of hydrogen;
    the treatment of said hydrogen-containing gas generated by thermal decomposition so that it is suitable for supplying said fuel cell; and
    the supplying of said fuel cell with said treated hydrogen-containing gas generated.

In view of the above remarks, it has been understood that the treatments in question of the hydrogen-containing gases generated (pyrotechnically then non-pyrotechnically) are a priori only capable of being of the cooling, depressurization, particulate filtration and chemical filtration type. Independently, they are not carried out or they are carried out, under more or less strict conditions, depending on the quality of the gases generated and on the operating conditions of the fuel cell.

It is possible to indicate, generally, that the treatment of the hydrogen-containing gas produced by self-sustaining combustion essentially consists of a cooling, a depressurization, a chemical filtration and a particulate filtration and that the treatment of the hydrogen-containing gas produced by thermal decomposition comprises at least one chemical filtration. It is possible to indicate more precisely that which follows.

According to one variant, the fuel cell in question operates at high temperature, i.e. conventionally between 100° C. and 220° C. It may in particular be a high-temperature fuel cell of PEMFC ("proton exchange membrane fuel cell" or "polymer electrolyte membrane fuel cell") type, operating, optimally, at 160° C. The treatment of the hydrogen-containing gas, produced by self-sustaining combustion, for supplying such a fuel cell, during its start-up phase, then consists essentially of a cooling (necessary for lowering the temperature of the combustion gases generated to a temperature suitable for the operation of the high-temperature fuel cell, but assuredly of a lower amplitude than the cooling necessary for lowering the temperature of combustion gases generated to a temperature suitable for the operation of a low-temperature fuel cell (see below)), a depressurization (necessary for lowering the pressure of the combustion gases generated to a pressure suitable for the fuel cell), a chemical filtration and a particulate filtration. Specifically, the hydrogen-containing gas produced by combustion is a hot pressurized gas loaded with poisonous gaseous species and with particles. It is therefore advisable to cool it, to depressurize it and to filter it chemically and mechanically. It requires for its cooling, within this context of a fuel cell operating at high temperature, devices that are less bulky than those required within the context of a low-temperature fuel cell. Regarding the treatment of the hydrogen-containing gas, produced by thermal decomposition, for supplying such a fuel cell, during the steady-state operation thereof, this is a lighter treatment. Said treatment comprises at least one chemical filtration (with regard to the elimination of the by-products of decomposition of the at least one hydrogen-containing reducing component used, of borazane in particular). It does not necessarily comprise depressurization (it is possible to produce the gases at atmospheric pressure by managing the heat input for the thermal decomposition), it does not generally comprise cooling (the gases not being generated very hot) and it does not comprise particulate filtration (insofar as the hydrogen-containing gases generated contain no or few particles).

According to another variant, the fuel cell in question operates at low temperature (at less than 100° C.). It may in particular be a low-temperature PEMFC fuel cell operating, optimally, at 80° C. The treatment of the hydrogen-containing gas, produced by self-sustaining combustion, for supplying such a fuel cell, during its start-up phase, then also essentially consists of a cooling (of greater amplitude than the cooling required within a context of a high-temperature fuel cell (see above)), a depressurization, a chemical filtration and a particulate filtration. Indeed, as indicated above, the hydrogen-containing gas produced by combustion is a hot pressurized gas loaded with particles and with poisonous gaseous species. Regarding the treatment of the hydrogen-containing gas, produced by thermal decomposition, for supplying such a fuel cell, during the steady-state operation thereof, reference may be made to the paragraph above.

The two variants specified above are not limiting. The implementation of the process of the invention with fuel cells operating at higher temperatures (>220° C.) is not excluded from the context of the invention. The treatments of the hydrogen-containing gases generated, in particular the cooling thereof, should obviously be adapted to the fuel cell in question. It is recalled, incidentally, that the nature of the solid charge that generates hydrogen-containing gas by thermal decomposition is also "adapted to" said fuel cell in question (in fact, to its operating temperature).

Indicated below, in a no way limitative way, is a recommended "logical" order for carrying out the treatments identified above, obligatory or not. After generation of the hydrogen-containing gases by self-sustaining combustion or thermal decomposition, the following are recommended 1) a particulate filtration (obligatory for the gases generated by combustion), 2) a cooling (having an amplitude adapted to the fuel cell in question), 3) a depressurization (=expansion; obligatory for the gases generated by combustion, necessary or unnecessary for the gases generated by thermal decomposition), and 4) a chemical filtration (obligatory for the gases generated by combustion and for the gases generated by thermal decomposition).

It may incidentally be noted here that, generally, all the means necessary for the implementation of these treatments adversely affect the overall device, in terms of weight, complexity and cost. From this point of view, the process of the invention is advantageous in that it only requires, for its implementation, such "light" means, insofar as it is mainly a thermal decomposition which is in question; the self-sustaining combustion (with oxidizing agent(s) in the charge in question) only being carried out for the starting. Thus there is always a small amount of hydrogen-containing gas generated by combustion that it is advisable to filter mechanically, to cool (with a high amplitude), to depressurize and to filter chemically. In any case, it is also advantageous to have a steady-state operation, without oxidizing agent: the risks of self-ignition are thus virtually nil.

It is furthermore understood of course that identical means, of use for the implementation of any one of these treatments, may be used successively to treat the hydrogen-containing gases generated pyrotechnically then those generated non-pyrotechnically.

It is now proposed to give specifications regarding the pyrotechnic charges (A) and non-pyrotechnic charges (B) suitable for the implementation of the process of the invention.

It was indicated that, for the start-up phase of the fuel cell, a hydrogen-containing gas, containing at least 70% by volume of hydrogen (hydrogen-containing gas suitable for supplying hydrogen fuel cells), is generated by self-sustaining combustion of at least one solid pyrotechnic charge that generates hydrogen-containing gas. These solid pyrotechnic charges that generate hydrogen-containing gases are referenced hereinbelow as charges A.

Said charges A may consist of charges from the prior art, formed of at least one product (one charge)
of conventional type, i.e. of block type (such monolithic blocks generally have a weight of several tens of grams to several hundreds of grams. They generally have a diameter (equivalent diameter) and a thickness (length) of greater than 3 cm. They may in particular consist of substantially cylindrical blocks having a height of from 50 to 100 mm and an equivalent diameter of from 50 to 100 mm),
of disk type (such disks, having a "thin" thickness generally combined with a "large" diameter (equivalent diameter), generally also have a weight of several tens of grams to several hundreds of grams),
of pellet type (such pellets generally have a weight of several tenths of a gram to several grams. They generally have an equivalent diameter of several mm (for example 5 mm) to 30 mm, for a constant or variable thickness of several mm (for example 5 mm) to 30 mm),
of granule type (such granules generally have a median diameter (by weight) of greater than 500 μm, for example of around 700 μm. They generally have a weight of several milligrams), or/and
of grain type (pulverulent powder: such grains generally have a median diameter (by weight) of less than or equal to 500 μm, for example of around 350 μm. They also generally have a weight of several milligrams);
having a composition of the type: inorganic oxidizing component(s)+hydrogen-containing reducing component(s) (see the introduction of the present text). In any case, their combustion releases a hydrogen-containing gas containing at least 70% by volume of hydrogen.

Suitable in particular for the implementation (of the starting phase) of the process of the invention are the pyrotechnic charges consisting of at least one pyrotechnic product containing, for at least 96% of its weight, at least one inorganic oxidizing component and at least one hydrogen-containing reducing component selected from inorganic hydrides, borazane and polyaminoboranes. The at least one inorganic oxidizing component (generally a single inorganic oxidizing component is present but the presence of at least two as a mixture could not be excluded) and the at least one specific hydrogen-containing reducing component (generally a single hydrogen-containing reducing component as identified above is present but the presence of at least two as a mixture could not be excluded) therefore represent at least 96% by weight (or even at least 98% by weight, or even 100% by weight) of the weight of the pyrotechnic product(s) advantageously used for generating, according to the invention, the hydrogen. The possible balance to 100% in general consists of additives, of the type of process additives, stability additives, static electricity desensitizing additives (such as $SiO_2$) and/or ballistic or combustion modifiers. The presence of impurities is not excluded. The presence of an organic binder, in a small amount, is also not completely excluded insofar as, within the context of the implementation of the process of the invention, a very high purity of the hydrogen generated is not necessarily required. Mention has been made of a hydrogen-containing gas containing at least 70% of hydrogen.

With reference to said at least one hydrogen-containing reducing component, it is possible, in a no way limitative way, to specify the following.

1) The at least one inorganic hydride capable of being present in the composition of the pyrotechnic products used is advantageously a borohydride, very advantageously an alkali metal or alkaline-earth metal borohydride. Preferably said at least one inorganic hydride is selected from sodium, lithium or magnesium borohydride. The pyrotechnic products used in the process of the invention therefore preferably contain in their composition, as inorganic hydride, $NaBH_4$, $LiBH_4$ or $Mg(BH_4)_2$.

2) The at least one hydrogen-containing reducing compound however preferably consists of borazane or an aminoborane polymer (a polyaminoborane). Particularly preferably, borazane is the only hydrogen-containing reducing compound present in the composition of the pyrotechnic products used.

With reference to said at least one inorganic oxidizing component, it is possible, in no way limitingly, to specify the following.

It is advantageously selected from those used according to the prior art in the technical field of fuel cells; i.e. from:
- perchlorates (it very advantageously consists of ammonium perchlorate),
- dinitramides (it very advantageously consists of ammonium dinitramide),
- nitrates (it very advantageously consists of strontium nitrate), and
- metal oxides (it advantageously consists of iron oxide ($Fe_2O_3$), vanadium oxide ($V_2O_5$), aluminum oxide ($Al_2O_3$), titanium oxide ($TiO_2$), manganese oxide ($MnO_2$), preferably of iron oxide ($Fe_2O_3$)).

The pyrotechnic products (constituting the pyrotechnic charges) used in the process of the invention (more precisely for the starting phase of said process of the invention, i.e. for the start-up phase of the fuel cell) therefore very advantageously contain $NH_4ClO_4$, $NH_4N(NO_2)_2$, $Sr(NO_3)_2$ or $Fe_2O_3$ (as oxidizing compound).

The pyrotechnic product(s) used (constituent(s) of the pyrotechnic charges A) preferably contain(s) in its (their) composition:
- from 40% to 80% by weight of at least one hydrogen-containing reducing component as identified above (generally of one such hydrogen-containing reducing component), and
- from 20% to 60% by weight of at least one inorganic oxidizing agent (generally of one such inorganic oxidizing agent).

They contain, particularly preferably:
- from 55% to 75% by weight of at least one hydrogen-containing reducing component as identified above (generally of one such hydrogen-containing reducing component), and
- from 25% to 45% by weight of at least one inorganic oxidizing agent (generally of one such inorganic oxidizing agent).

It is, generally, also very advantageous for said pyrotechnic product(s) to contain more than 50% by weight of hydrogen-containing reducing component(s), more advantageously still for said pyrotechnic product(s) to contain more than 70% by weight of hydrogen-containing reducing component(s). It has been understood that said hydrogen-containing reducing component(s) present constitute(s) the reserve of hydrogen.

It is recalled here, for all practical purposes, that the at least one pyrotechnic charge A used for the generation of hydrogen (by self-sustaining combustion) may consist of at least one pyrotechnic product that is in the form of a block, a disk, a pellet, a granule, and/or a grain. Said at least one pyrotechnic product has any shape, for example spherical, ovoid or cylindrical. It is understood that use is generally made of several grains, several granules and one or more pellets, one or more disks, one or more blocks (often a single block) for the start-up of the fuel cell; the use of large-size charges not being a priori necessary for such a (simple) start-up.

The processes for obtaining these solid pyrotechnic products are known processes, described in particular in the EP patent applications identified on page 2 of the present text.

Not all the products constituting the pyrotechnic charge A necessarily have the same composition. They are however all "precursors of hydrogen" within the meaning of the invention (=that generate, by self-sustaining combustion, a hydrogen-containing gas containing at least 70% by volume of hydrogen).

Said at least one pyrotechnic charge burns following its ignition. Indications that are in no way limiting are given below regarding conventional ignition means that can be used.

It was indicated that, for the steady-state operation of the fuel cell, a hydrogen-containing gas, containing at least 85% by volume of hydrogen (hydrogen-containing gas suitable for supplying hydrogen to fuel cells), is generated by thermal decomposition of at least one solid (non-pyrotechnic) charge that generates hydrogen-containing gas (said thermal decomposition being started and maintained by a portion of the heat produced by the fuel cell in operation). These solid non-pyrotechnic charges that generate hydrogen-containing gases are referenced hereinbelow as charges B.

Said charges B may consist of charges from the prior art, formed of at least one product (one charge)
- of conventional type, i.e. of block type (such monolithic blocks generally have a weight of several tens of grams to several hundreds of grams. They generally have a diameter (equivalent diameter) and a thickness (length) of greater than 5 cm. They may in particular consist of substantially cylindrical blocks having a height of from 50 to 120 mm and an equivalent diameter of from 50 to 120 mm),
- of disk type (such disks, having a "thin" thickness generally combined with a "large" diameter (equivalent diameter), generally have a weight of several tens of grams to several hundreds of grams),
- of pellet type (such pellets generally have a weight of several tenths of a gram to several grams. They generally have an equivalent diameter of several mm (for example 5 mm) to 30 mm, for a constant or variable thickness of several mm (for example 5 mm) to 30 mm),
- of granule type (such granules generally have a median diameter (by weight) of greater than 500 µm, for example of around 700 µm. They generally have a weight of several milligrams), or/and
- of grain type (pulverulent powder: such grains generally have a median diameter (by weight) of less than or equal to 500 µm, for example of around 350 µm. They also generally have a weight of several milligrams);
- with a composition, free of oxidizing compound, essentially containing at least one hydrogen-containing reducing component selected from inorganic hydrides, borazane and polyaminoboranes. In any case, their thermal decomposition (≠combustion) releases a hydrogen-containing gas containing at least 85% by volume of hydrogen.

Suitable in particular for the steady-state operation of the fuel cell are the (non-pyrotechnic) charges consisting of at least one (non-pyrotechnic) product containing, for at least 95% of its weight, advantageously for at least 99% of its weight, at least one hydrogen-containing component selected from inorganic hydrides, borazane and polyaminoboranes. The at least one hydrogen-containing component generally consists of one of the above components; a hydride (advantageously a borohydride), a polyaminoborane or borazane. It consists very advantageously of borazane (said borazane, the thermal decomposition of which starts at low temperature, is particularly suitable, within the context of the implementation of the process of the invention, for supplying hydrogen-containing gas to the abovementioned (high- and low-temperature) PEMFC fuel cells). As regards the hydrides, since the operating temperature of the fuel cell is known, a hydride is selected, for supplying said fuel cell with hydrogen, which has an appropriate decomposition temperature (i.e. that is capable of being substantially decomposed by the heat originating from the fuel cell). The possible balance to 100% in general consists of at least one additive (for example of the process additive, stability additive type) and/or of a coating that thermally stabilizes the charge.

Not all the products constituting said charge B necessarily have the same composition. They are however all "precursors of hydrogen" within the meaning of the invention (=that generate, by thermal decomposition, a hydrogen-containing gas containing at least 85% by volume of hydrogen).

The processes for obtaining the constituent solid products of the charges B are known to a person skilled in the art. They are of the type of the processes for obtaining the constituent solid products of the charges A (see above), the composition of said constituent solid products of the charges B obviously containing no inorganic oxidizing component.

It was indicated above that borazane advantageously constitutes the (sole) hydrogen-containing reducing component of the at least one pyrotechnic product constituting the charge A and that borazane also advantageously constitutes the (sole) hydrogen-containing component of the at least one non-pyrotechnic product constituting the charge B. Thus, according to one particularly preferred variant, the process of the invention is carried out with charges A and B, as specified hereinbelow: the at least one solid pyrotechnic charge (A) that generates hydrogen-containing gas by self-sustaining combustion is a pyrotechnic charge consisting of at least one pyrotechnic product containing, for 40% to 80% of its weight (preferably 55% to 75% of its weight), borazane, as sole hydrogen-containing reducing component, and the at least one solid charge (B) that generates hydrogen-containing gas by thermal decomposition is a charge consisting of at least one product containing, for at least 95% of its weight, advantageously for at least 99% of its weight, borazane (as sole hydrogen-containing component). Within the context of this preferred variant, borazane is the sole precursor of hydrogen used. Borazane, in the presence of at least one oxidizing agent (charge A), is initially combusted, for the start-up of the fuel cell. Then, for the steady-state operation of said fuel cell, borazane (charge B) is thermally decomposed.

Within the context of the implementation of the process of the invention, the function of the pyrotechnic charge A can be likened to that of an "ignition device" of the fuel cell, in a more illustrative manner the function of the pyrotechnic charge A can be likened to that of a "match".

The limited weight of the "ignition" charge A has already been mentioned. It may be specified, in no way limitingly, that generally the weight ratio between the at least one solid pyrotechnic charge (A) that generates hydrogen-containing gas by self-sustaining combustion ("ignition charge", for initiating the fuel cell) and the at least one solid charge (B) that generates hydrogen-containing gas by thermal decomposition ("operating charge") is less than or equal to 0.5, advantageously less than or equal to 0.1, very advantageously less than or equal to 0.05. This weight ratio obviously relates to said charges (A) and (B) before their use for the implementation of the process of the invention, i.e. before their successive consumption, respectively by self-sustaining combustion and by thermal decomposition.

As regards the heat transfer from the started-up fuel cell to the at least one non-pyrotechnic charge B to be thermally decomposed, a person skilled in the art understands that it may be carried out according to various modes, with various types of conventional means (appropriate arrangement of the parts of the device in question inducing heat exchanges and/or presence of heat exchangers, of heat pipe type, of tube heat exchanger type, of plate heat exchanger type, of spiral heat exchanger type, etc.).

According to a second subject matter, the present invention relates to a device for generating electricity that is very particularly suitable for the implementation of the process described above (for the implementation therefore, in succession, of the start-up and steady-state operation phases of a fuel cell).

Said device comprises a fuel cell, means for start-up of said fuel cell, and means for the steady-state operation of said fuel cell.

The means for start-up of said fuel cell comprise:
at least one combustion chamber suitable for the self-sustaining combustion, within it, of at least one solid pyrotechnic charge that generates hydrogen-containing gas containing at least 70% by volume of hydrogen (charge A (see above)), equipped with means for igniting said at least one solid pyrotechnic charge, and
communication means connecting said at least one combustion chamber and said fuel cell, equipped with means for treating the gas generated by the self-sustaining combustion of said at least one solid pyrotechnic charge, for the delivery to said fuel cell of said generated and treated hydrogen-containing gas.

With reference to said at least one combustion chamber equipped with ignition means (see above), it is possible, in no way limitingly, to indicate the following. Such a combustion chamber is known per se. It generally consists of a mechanical assembly equipped therefore with ignition means. The ignition means generally consist of an igniter (i.e. an initiation module; such a module advantageously triggers the ignition by mechanical stress (in order to avoid any superfluous consumption of electrical energy). Such a module therefore advantageously comprises a piezoelectric relay or a fuse striker), in connection with the user system, through a leaktight passage that withstands the operating pressure. Said ignition means optionally comprise an ignition relay pyrotechnic charge (pellet). In the internal volume of said at least one combustion chamber (of the mechanical assembly), a device (of basket type, for example) for holding or stabilizing the pyrotechnic charge(s) (the various constituent elements of which may be random or structured) is generally arranged (so as to limit the space requirement of the pyrotechnic charge(s), to limit the mechanical stresses of said charge(s) (of the constituent elements thereof, if it (they) is (are) not one-piece charge(s)) in response to the vibrations of the system and to retain the combustion residues). The at least one combustion chamber obviously comprises (at least) one delivery orifice for delivering (under pressure) the gases generated within it (at high pressure), delivery through the communication means connecting it to the fuel cell. Said communication means essentially consist of at least one line that may be described as first line(s).

The means for treating the gas generated render this gas suitable for supplying the fuel cell; in general they conventionally comprise cooling means, a pressure-reducing valve, a particle filter and a chemical filter (for example of the type:

adsorbent zeolite filter or metal membranes for separating hydrogen (in particular made of palladium or a metal alloy containing palladium)).

The means for the steady-state operation of the fuel cell comprise:
- at least one thermal decomposition chamber suitable for the thermal decomposition, within it, of at least one solid charge that generates hydrogen-containing gas containing at least 85% by volume of hydrogen (charge B (see above)),
- communication means connecting said at least one thermal decomposition chamber and said fuel cell, equipped with means for treating the hydrogen-containing gas generated by the thermal decomposition of said at least one solid charge, for the delivery to said fuel cell of said generated and treated hydrogen-containing gas, and
- heat exchange means for ensuring a heat transfer from said fuel cell to said thermal decomposition chamber.

The at least one thermal decomposition chamber is also known per se. It does not itself need to be equipped with any ignition means (heat produced by the started-up fuel cell starts and maintains the thermal decomposition). In the internal volume of said at least one thermal decomposition chamber, a device (basket, for example) for holding or stabilizing the charge(s) (the various constituent elements of which (provision is however expressly made for the presence of a single block) may be random or structured) is generally also arranged (in order, in the same way, to limit the space requirement of the charge(s), to limit the mechanical stresses of said charge(s) (of the constituent elements thereof, if it (they) is (are) not one-piece charge(s)) in response to the vibrations of the system and to retain the thermal decomposition residues). The at least one thermal decomposition chamber obviously comprises (at least) one delivery orifice for delivering (optionally under pressure) the gases generated within it (optionally under pressure), delivery through the communication means connecting it to the fuel cell. Said means essentially consist of a line that may be described as second line(s).

The means for treating the gas generated render this gas suitable for supplying the fuel cell; they may be limited to a chemical filter (for example of the type: adsorbent zeolite filter or metal membranes for separating hydrogen (in particular made of palladium or a metal alloy containing palladium)). They comprise, if necessary, depressurization means (see above).

The heat exchange, from the fuel cell to the thermal decomposition chamber, is carried out by conventional means (heat exchangers of heat pipe type, of tube heat exchanger type, of plate heat exchanger type, of spiral heat exchanger type, etc.) and/or by an appropriate arrangement of the parts of the device in question. Reference is generally made to heat exchange means.

As indicated above, it is understood that the same means can be used successfully to treat the hydrogen-containing gases generated pyrotechnically then those generated non-pyrotechnically.

The device of the invention advantageously comprises a single combustion chamber connected to the fuel cell and a single thermal decomposition chamber connected to the fuel cell. The combustion chamber/fuel cell connection, for the transfer of the starting hydrogen-containing gas (via at least one first line), on the one hand and 1) the thermal decomposition chamber/fuel cell connection, for the transfer of the operating hydrogen-containing gas (via at least one second line) and 2) the fuel cell/thermal decomposition chamber connection, for the heat transfer, on the other hand, obviously constitute the key aspects of the invention.

BRIEF DESCRIPTION OF THE DRAWING

It is now proposed to illustrate the invention, in a no way limitative way, regarding its process and device aspects, by the appended FIGURE.

Figure 1:
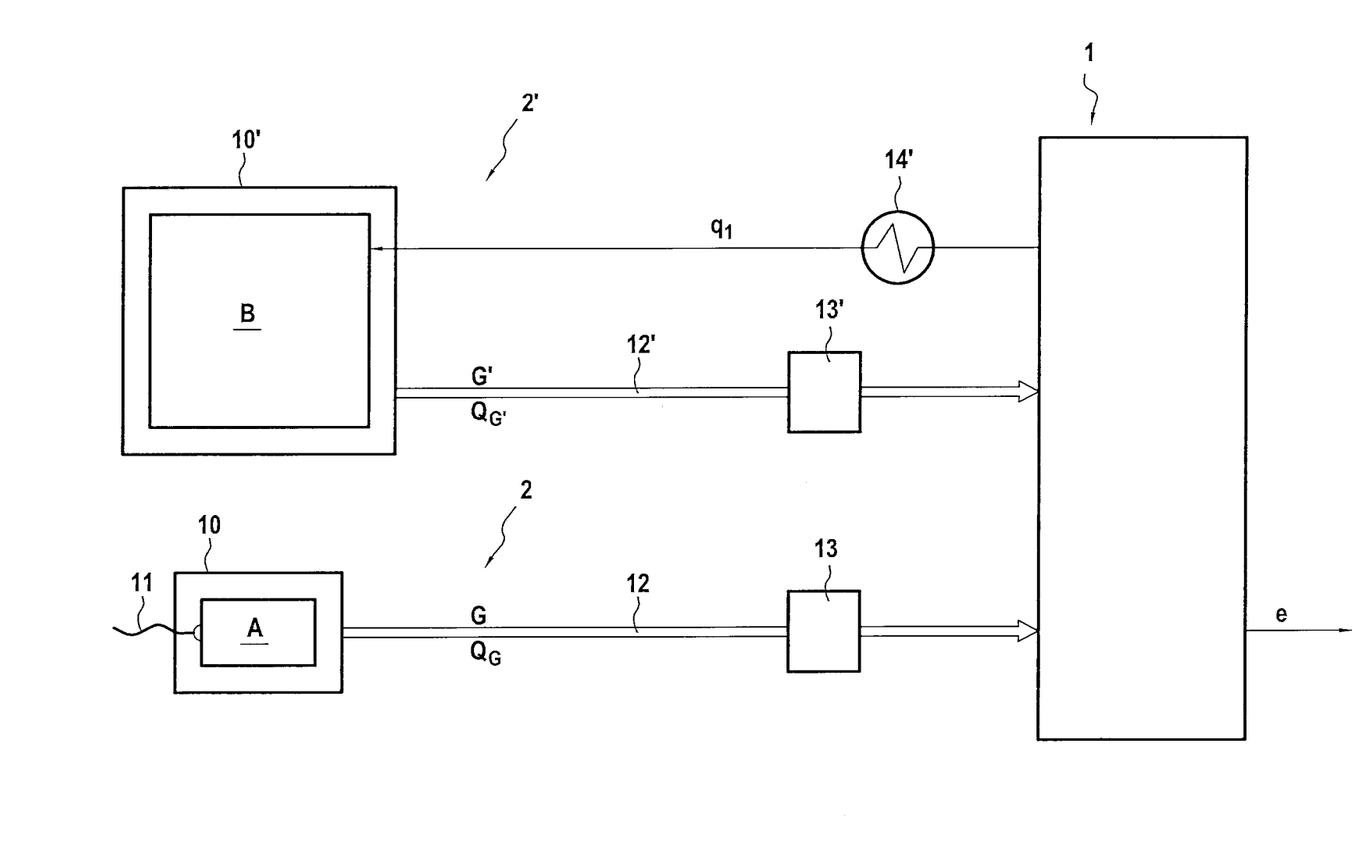
FIG. 1 schematic represents a fuel cell, a means for start-up of the fuel cell and a means for the steady-state operation of the fuel cell according to an embodiment of the invention.

Represented schematically in said FIG. 1, are:
- as 1, a fuel cell generating, in operation, electricity e and heat,
- as 2, the means for start-up of said fuel cell 1, and
- as 2', the means for the steady-state operation of said fuel cell 1.

The means 2 for start-up of said fuel cell 1 comprise:
- the combustion chamber 10 suitable for the self-sustaining combustion, within it, of a solid pyrotechnic charge A that generates hydrogen-containing gas, equipped with means 11 for igniting said solid pyrotechnic charge A, and
- communication means, i.e. the line 12, connecting said combustion chamber 10 and said fuel cell 1. Said line 12 is equipped with means 13 for treating the hydrogen-containing gas G generated by the self-sustaining combustion of said solid pyrotechnic charge A. Said hydrogen-containing gas G is generated hot (hence the indication of the amount of heat $Q_G$ that it transports), under pressure and it transports solid particles and gaseous species that are poisonous for the catalyst of the fuel cell 1. Said treated (cooled, depressurized, filtered (to "eliminate" said solid particles and said poisonous gaseous species)) gas G is suitable for supplying the fuel cell 1.

The fuel cell 1 is therefore, according to the process of the invention, started up, with the means 2 described above, owing to the combustion of the pyrotechnic charge A, more precisely owing to the hydrogen-containing gas G resulting from said combustion.

The means 2' for the steady-state operation of the fuel cell 1 comprise:
- a thermal decomposition chamber 10' suitable for the thermal decomposition, within it, of a solid charge B that generates hydrogen-containing gas,
- communication means, i.e, the line 12', connecting said thermal decomposition chamber 10' and said fuel cell 1. Said line 12' is equipped with means 13' for treating the hydrogen-containing gas G' generated by the thermal decomposition of the solid charge B. Said hydrogen-containing gas is generated "hot" (hence the indication of the amount of heat $Q_{G'}$ that it transports; it is however understood that $Q_{G'} \ll Q_G$), optionally under pressure and it transports gaseous species that are poisonous for the catalyst of the fuel cell 1. Said treated (filtered (to "eliminate" said poisonous gaseous species), optionally depressurized) gas G' is suitable for supplying the fuel cell 1, and
- heat exchange means 14' for ensuring a heat transfer from said fuel cell 1 to said thermal decomposition chamber 10'. The amount of heat transferred has been referenced $q_{l_1}$.

The fuel cell 1, according to the process of the invention, therefore operates in steady state (once the fuel cell 1 has been started up (see above)), with the means 2' described above, owing to the thermal decomposition of the (non-pyrotechnic) charge B, more precisely owing to the hydrogen-containing gas G' resulting from said thermal decomposition. Said thermal decomposition is carried out (started and maintained) by the amount of heat $q_1$.

Purely by way of illustration, specifications regarding one method of implementation of the process of the invention are given below.

The fuel cell in question is a PEMFC fuel cell operating at high temperature (optimum operating temperature of 160° C.). It delivers 8 kW of direct current electrical energy (and at the same time 8 kW of thermal energy) when it is supplied with hydrogen at a flow rate of 0.2 g/s. Supplied at such a flow rate, it requires 2 min of start-up (in order for its temperature to go from 20° C. (ambient temperature) to 160° C. (its optimum operating temperature)).

In order to operate said fuel cell for 30 min, use is made, according to the invention, in succession, of the charges A and B below.

Charge A used for the start-up phase:
a block with a composition 70% borazane/30% strontium nitrate (% by weight), burning according to a self-sustaining combustion with a hydrogen yield of 11% (by weight),
of cylindrical shape, with a diameter of 60 mm and a height of 85 mm,
having a density of 0.958 g/cm³.

Such a block of 230 g is suitable for providing 25 g of hydrogen, which is sufficient for the starting of the fuel cell.

Charge B used for the steady-state operation:
five superposed blocks consisting (to 100%) of borazane, decomposing at 160° C. with a hydrogen yield of 13% (by weight) (at this temperature, borazane releases its first two moles of hydrogen),
of cylindrical shape, each with a diameter of 90 mm and a height of 110 mm,
having a density of 0.750 g/cm³.

The charge (consisting of the five superposed blocks) having a total weight of 2.624 kg is suitable for providing 341 g of hydrogen, which is sufficient to operate the fuel cell for 28 min.

The invention claimed is:

1. A process for generating electricity with a fuel cell, comprising in succession:
performing a start-up phase of said fuel cell, and
performing a steady-state operation of said fuel cell, during which said fuel cell, supplied with a hydrogen-containing gas, generates electricity and heat,
wherein, for its start-up, said fuel cell is supplied with a hydrogen-containing gas, containing at least 70% by volume of hydrogen, generated by self-sustaining combustion of at least one solid pyrotechnic charge that generates hydrogen-containing gas; and
wherein, during its steady-state operation, said fuel cell is supplied with a hydrogen-containing gas, containing at least 85% by volume of hydrogen, generated by thermal decomposition of at least one solid charge that generates hydrogen-containing gas; a portion of the heat produced by said fuel cell in operation being transferred to said at least one solid charge for starting and maintaining the thermal decomposition thereof.

2. The process as claimed in claim 1, wherein said start-up phase comprises:
self-sustaining combusting said at least one solid pyrotechnic charge in order to generate the hydrogen-containing gas containing at least 70% by volume of hydrogen;
treating said hydrogen-containing gas generated by self-sustaining combustion so that it is suitable for supplying said fuel cell;
supplying said fuel cell with said treated hydrogen-containing gas generated; and
where said steady-state operation comprises:
thermally decomposing, with a portion of the heat produced by said fuel cell, said at least one solid charge, in order to generate the hydrogen-containing gas containing at least 85% by volume of hydrogen;
treating said hydrogen-containing gas generated by thermal decomposition so that it is suitable for supplying said fuel cell; and
supplying said fuel cell with said treated hydrogen-containing gas generated.

3. The process as claimed in claim 1, wherein the treatment of said hydrogen-containing gas produced by self-sustaining combustion essentially consists of a cooling, a depressurization, a chemical filtration and a particulate filtration and wherein the treatment of said hydrogen-containing gas produced by thermal decomposition comprises at least one chemical filtration.

4. The process as claimed in claim 1, wherein said at least one solid pyrotechnic charge that generates hydrogen-containing gas by self-sustaining combustion is a pyrotechnic charge consisting of at least one pyrotechnic product containing, for at least 96% of its weight, at least one inorganic oxidizing component and at least one hydrogen-containing reducing component selected from inorganic hydrides, borazane and polyaminoboranes.

5. The process as claimed in claim 4, wherein said at least one hydrogen-containing reducing component selected from inorganic hydrides is selected from inorganic borohydrides.

6. The process as claimed in claim 4, wherein said at least one hydrogen-containing reducing component is selected from borazane and polyaminoboranes.

7. The process as claimed in claim 4, wherein said at least one inorganic oxidizing component is selected from perchlorates, dinitramides, nitrates and metal oxides.

8. The process as claimed in claim 4, wherein said at least one pyrotechnic product contains:
from 40% to 80% by weight of said at least one hydrogen-containing reducing component, and
from 20% to 60% by weight of said at least one inorganic oxidizing component.

9. The process as claimed in claim 1, wherein said at least one solid charge that generates hydrogen-containing gas by thermal decomposition is a charge consisting of at least one product containing, for at least 95% of its weight, at least one hydrogen-containing component selected from inorganic hydrides, borazane and polyaminoboranes.

10. The process as claimed in claim 1, wherein said at least one solid pyrotechnic charge that generates hydrogen-containing gas by self-sustaining combustion is a pyrotechnic charge consisting of at least one pyrotechnic product containing, for 40% to 80% of its weight, borazane, as sole hydrogen-containing reducing component, and wherein said at least one solid charge that generates hydrogen-containing gas by thermal decomposition is a charge consisting of at least one product containing, for at least 95% of its weight, borazane.

11. The process as claimed in claim 1, wherein said at least one solid pyrotechnic charge that generates hydrogen-containing gas by self-sustaining combustion and said at least one solid charge that generates hydrogen-containing gas by thermal decomposition have, before they are consumed, a weight ratio less than or equal to 0.5.

12. A device for generating electricity, suitable for the implementation of the process as claimed in claim 1, comprising:
- a fuel cell,
- means for start-up of said fuel cell, and
- means for the steady-state operation of said fuel cell, wherein said means for start-up of said fuel cell comprise:
  - at least one combustion chamber suitable for the self-sustaining combustion, within it, of at least one solid pyrotechnic charge that generates hydrogen-containing gas containing at least 70% by volume of hydrogen, equipped with means for igniting said at least one solid pyrotechnic charge, and
  - communication means connecting said at least one combustion chamber and said fuel cell, equipped with means for treating the gas generated by the self-sustaining combustion of said at least one solid pyrotechnic charge, for the delivery to said fuel cell of said generated and treated hydrogen-containing gas (G); and wherein said means for the steady-state operation of said fuel cell comprise:
- at least one thermal decomposition chamber suitable for the thermal decomposition, within it, of at least one solid charge (B) that generates hydrogen-containing gas containing at least 85% by volume of hydrogen,
- communication means connecting said at least one thermal decomposition chamber and said fuel cell, equipped with means for treating the hydrogen-containing gas generated by the thermal decomposition of said at least one solid charge, for the delivery to said fuel cell of said generated and treated hydrogen-containing gas, and
- heat exchange means for ensuring a heat transfer from said fuel cell to said thermal decomposition chamber.

13. The process as claimed in claim 5, wherein said at least one hydrogen-containing reducing component selected from inorganic hydrides is selected from alkali metal and alkaline-earth metal borohydrides.

14. The process as claimed in claim 5, wherein said at least one hydrogen-containing reducing component selected from inorganic hydrides is selected from sodium, lithium and magnesium borohydrides.

15. The process as claimed in claim 6, wherein said at least one hydrogen-containing reducing component consists of borazane.

16. The process as claimed in claim 7, wherein said at least one inorganic oxidizing component is selected from ammonium perchlorate, ammonium dinitramide, strontium nitrate and iron oxide.

17. The process as claimed in claim 8, wherein said at least one pyrotechnic product contains:
- from 55% to 75% by weight of said at least one hydrogen-containing reducing component, and
- from 25% to 45% by weight of said at least one inorganic oxidizing component.

18. The process as claimed in claim 9, wherein said at least one solid charge that generates hydrogen-containing gas by thermal decomposition is a charge consisting of at least one product containing, for at least 95% of its weight, borazane.

19. The process as claimed in claim 11, wherein said at least one solid pyrotechnic charge that generates hydrogen-containing gas by self-sustaining combustion and said at least one solid charge that generates hydrogen-containing gas by thermal decomposition have, before they are consumed, a weight ratio less than or equal to 0.1.

20. The process as claimed in claim 11, wherein said at least one solid pyrotechnic charge that generates hydrogen-containing gas by self-sustaining combustion and said at least one solid charge that generates hydrogen-containing gas by thermal decomposition have, before they are consumed, a weight ratio less than or equal to 0.05.

* * * * *